(12) United States Patent
Kuzuyama et al.

(10) Patent No.: US 9,376,980 B2
(45) Date of Patent: Jun. 28, 2016

(54) FUEL INJECTION DEVICE

(75) Inventors: Hiroshi Kuzuyama, Kariya (JP);
Tsutomu Kawae, Kariya (JP);
Masahiro Machida, Kariya (JP);
Takehito Hamamatsu, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 269 days.

(21) Appl. No.: 14/004,009

(22) PCT Filed: Mar. 7, 2012

(86) PCT No.: PCT/JP2012/055857
§ 371 (c)(1),
(2), (4) Date: Sep. 9, 2013

(87) PCT Pub. No.: WO2012/124573
PCT Pub. Date: Sep. 20, 2012

(65) Prior Publication Data
US 2013/0340720 A1    Dec. 26, 2013

(30) Foreign Application Priority Data
Mar. 11, 2011 (JP) .................................. 2011-054716

(51) Int. Cl.
*F02D 41/30* (2006.01)
*F02D 41/40* (2006.01)
(Continued)

(52) U.S. Cl.
CPC ............ *F02D 41/30* (2013.01); *F02D 41/3035* (2013.01); *F02D 41/402* (2013.01); *F02D 35/028* (2013.01); *F02D 2041/389* (2013.01); *Y02T 10/128* (2013.01); *Y02T 10/44* (2013.01)

(58) Field of Classification Search
CPC .... F02D 41/30; F02D 41/402; F02D 41/3035
USPC .................... 123/299, 300, 435; 701/103–105
See application file for complete search history.

(56) References Cited

U.S. PATENT DOCUMENTS 6,684,852 B2 *  2/2004  Wright ...................... F02B 1/12
                                                      123/295
6,701,886 B2    3/2004  Walter et al.
(Continued)

FOREIGN PATENT DOCUMENTS

| | | |
|---|---|---|
| CN | 1614211 A | 5/2005 |
| DE | 10344423 A1 | 4/2005 |

(Continued)

OTHER PUBLICATIONS

Translation of the International Preliminary Report on Patentability for corresponding International Patent Application No. PCT/JP2012/055857 mailed Sep. 19, 2013.

(Continued)

*Primary Examiner* — Hai Huynh
(74) *Attorney, Agent, or Firm* — Sughrue Mion, PLLC

(57) ABSTRACT

A fuel injection device is provided with a fuel injection valve to inject fuel into a combustion chamber of an engine, and an electronic control unit to operate the fuel injection valve to inject the fuel in multiple separate injections. The electronic control unit controls a timing of a first fuel injection by the fuel injection valve to carry out the first fuel injection on the retard side with respect to a timing when a premix duration immediately after the first fuel injection is minimum, and controls a timing of a second fuel injection by the fuel injection valve in such a manner that a heat release rate waveform produced by the first fuel injection and the second fuel injection carried out thereafter has a double-peaked shape.

15 Claims, 14 Drawing Sheets

(51) Int. Cl.
*F02D 41/38* (2006.01)
*F02D 35/02* (2006.01)

(56) References Cited

U.S. PATENT DOCUMENTS

| | | | |
|---|---|---|---|
| 7,497,199 B2* | 3/2009 | Canale | F02D 35/023 |
| | | | 123/299 |
| 8,437,945 B2* | 5/2013 | Haskara et al. | 701/105 |
| 8,596,242 B2* | 12/2013 | Nada | F02D 41/403 |
| | | | 123/299 |
| 8,682,568 B2* | 3/2014 | Shimo | F02D 41/3035 |
| | | | 123/299 |
| 2004/0154582 A1 | 8/2004 | Shimazaki | |
| 2005/0092286 A1 | 5/2005 | Sasaki et al. | |

FOREIGN PATENT DOCUMENTS

| | | |
|---|---|---|
| DE | 102007000392 A1 | 1/2008 |
| EP | 1607609 A1 | 12/2005 |
| FR | 2899283 A1 | 10/2007 |
| JP | 2005-155603 A | 6/2005 |
| JP | 2009-264332 A | 11/2009 |
| JP | 2010-180718 A | 8/2010 |
| WO | 2009106647 A1 | 9/2009 |
| WO | 2010/087017 A1 | 8/2010 |
| WO | 2010/122643 A1 | 10/2010 |

OTHER PUBLICATIONS

Communication dated Oct. 2, 2015 from the European Patent Office in counterpart application No. 12756910.1.

* cited by examiner (a)

(b)

FUEL INJECTION DEVICE

CROSS REFERENCE TO RELATED APPLICATIONS

This application is a National Stage of International Application No. PCT/JP2012/055857 filed Mar. 7, 2012, claiming priority based on Japanese Patent Application No. 2011-054716 filed Mar. 11, 2011, the contents of all of which are incorporated herein by reference in their entirety.

TECHNICAL FIELD

The present invention relates to a fuel injection device for an engine to perform Premixed Charge Compression Ignition (PCCI) combustion.

BACKGROUND ART

The conventionally known fuel injection devices include, for example, those described in Patent Literatures 1 and 2. The fuel injection device described in Patent Literature 1 shifts a fuel injection mode between a diffusion combustion mode and a premixed combustion mode according to engine loads. When this fuel injection device shifts the fuel injection mode from the diffusion combustion mode to the premixed combustion mode, it gradually decreases a fuel injection quantity (quantity of injected fuel) of main injection while gradually increasing a fuel injection quantity of pilot injection, with gradual decrease in oxygen concentration in a combustion chamber, and gradually narrows the interval between pilot injection and main injection.

The fuel injection device described in Patent Literature 2 injects fuel contributing to combustion, in two separate injections. At this time, the first time injection is carried out at timing to enable premixed combustion and the second time injection is carried out at timing to enable premixed combustion and before the compression top dead center (TDC). Furthermore, the timing of the first time injection is advanced with increase in engine load to expand the interval between the first time injection and the second time injection.

CITATION LIST

Patent Literature

Patent Literature 1: Japanese Patent Application Laid-open No. 2010-180718
Patent Literature 2: Japanese Patent Application Laid-open No. 2009-264332

SUMMARY OF INVENTION

Technical Problem

However, there are the following problems in the above conventional technologies. In the fuel injection device described in Patent Literature 1, the fuel is easy to diffuse and hard to combust because the fuel injection quantity of the pilot injection is smaller than that of the main injection. For this reason, when the premixed combustion is carried out in a state in which the oxygen concentration in the combustion chamber is reduced, the fuel of the pilot injection and the fuel of the main injection combust almost simultaneously. In this case, a heat release rate peak due to high-temperature oxidation reaction becomes high, so as to raise an in-cylinder pressure increase rate and tend to increase combustion noise. Furthermore, since such a premixed combustion form is a combustion form similar to premixed charge compression ignition of a single injection, the problem of the premixed charge compression ignition combustion of producing a large amount of unburned HC and unburned CO cannot be satisfactorily solved.

In the fuel injection device described in Patent Literature 2, the timing of the first time injection is advanced with increase in engine load, thereby to ensure a sufficient premix duration (time period from an end of fuel injection to a start of high-temperature oxidation reaction), whereby fuel and air are sufficiently mixed and stirred. However, if the injection timing is advanced in a direct injection engine with each piston having a cavity formed in a central region thereof, there will arise a new factor to increase HC and CO. In the engine of this structure, fuel is injected into multiple directions in the cavity, at specific timing. However, if the injection of fuel is carried out in a period in which the timing of the first time injection is advanced, i.e., in which the piston is located below in a compression stroke, the injected fuel will not stay in the cavity and tend to adhere to the wall surface of the cylinder. Since the fuel adhering to the wall surface of the cylinder at low temperature due to action of engine cooling water fails to combust well, it can be a factor to increase HC or CO. If the advance angle range of the fuel injection timing is restricted in order to avoid this problem, it will be infeasible to ensure a time period for sufficient mixing of air into increased fuel and it will become difficult as a result to sufficiently reduce smoke.

An object of the present invention is to provide a fuel injection device capable of sufficiently reducing the combustion noise, HC and CO, and smoke.

Solution to Problem

The present invention is a fuel injection device for an engine to perform premixed charge compression ignition combustion, comprising: a fuel injection valve configured to inject fuel into a combustion chamber of the engine; and controlling means for controlling the fuel injection valve to inject the fuel in multiple separate injections, wherein the controlling means controls a timing of a first fuel injection by the fuel injection valve to carry out the first fuel injection on the retard side with respect to a timing when a premix duration immediately after the first fuel injection is minimum, and controls a timing of a second fuel injection by the fuel injection valve in such a manner that a heat release rate waveform produced by the first fuel injection and the second fuel injection carried out thereafter has a double-peaked shape.

In the fuel injection device of the present invention, the timing of the first fuel injection by the fuel injection valve is controlled in such a manner that the first fuel injection is carried out on the retard side with respect to the timing when the premix duration immediately after the first fuel injection is minimum. This control lengthens a time domain present after the compression top dead center in the premix duration immediately after the first fuel injection and mixing of air and fuel is sufficiently promoted by effective use of flow of air (reverse squish flow) from the cavity formed in the central region of the piston in the engine toward the squish area. This can sufficiently reduce smoke.

The timing of the second fuel injection by the fuel injection valve is controlled in such a manner that the heat release rate waveform produced by the first fuel injection and the second fuel injection carried out thereafter has the double-peaked shape. This suppresses heat release rate peaks by fuel injections and thus sufficiently reduces the combustion noise. Furthermore, since unburned components remaining after the first fuel injection are burned by the second fuel injection, HC and CO are sufficiently reduced.

The controlling means may control the timing of the first fuel injection by the fuel injection valve in such a manner that a starting timing of high-temperature oxidation reaction caused by the first fuel injection is after a compression top dead center. In this case, the time domain present after the compression top dead center in the premix duration immediately after the first fuel injection is lengthened, so as to surely promote the mixing of air and fuel by effective use of the reverse squish flow.

The controlling means may control the timing of the second fuel injection by the fuel injection valve to carry out the second fuel injection after a heat release rate peak due to low-temperature oxidation reaction caused by the first fuel injection and before a heat release rate peak due to high-temperature oxidation reaction caused after the low-temperature oxidation reaction by the first fuel injection. In this case, it becomes easier to securely make the heat release rate waveform produced by the first and second fuel injections, in the double-peaked shape. Furthermore, since latent heat of vaporization is made in the combustion chamber by the second fuel injection, the high-temperature oxidation reaction caused by the first fuel injection becomes slow. Therefore, the heat release rate peak by the first fuel injection is further suppressed, so as to further reduce the combustion noise.

The controlling means may control the timing of the second fuel injection by the fuel injection valve to carry out the second fuel injection before a start of the high-temperature oxidation reaction caused by the first fuel injection. In this case, the ignition lag by the second fuel injection becomes longer because the ambient temperature in the combustion chamber is low during the period of the second fuel injection. Therefore, a sufficient premix duration immediately after the second fuel injection is ensured, so as to further reduce the smoke.

Advantageous Effect of Invention

The present invention provides the fuel injection device capable of sufficiently reducing the combustion noise, HC and CO, and smoke.

DESCRIPTION OF EMBODIMENTS

The preferred embodiments of the present invention will be described below in detail with reference to the accompanying drawings.

Figure 1:
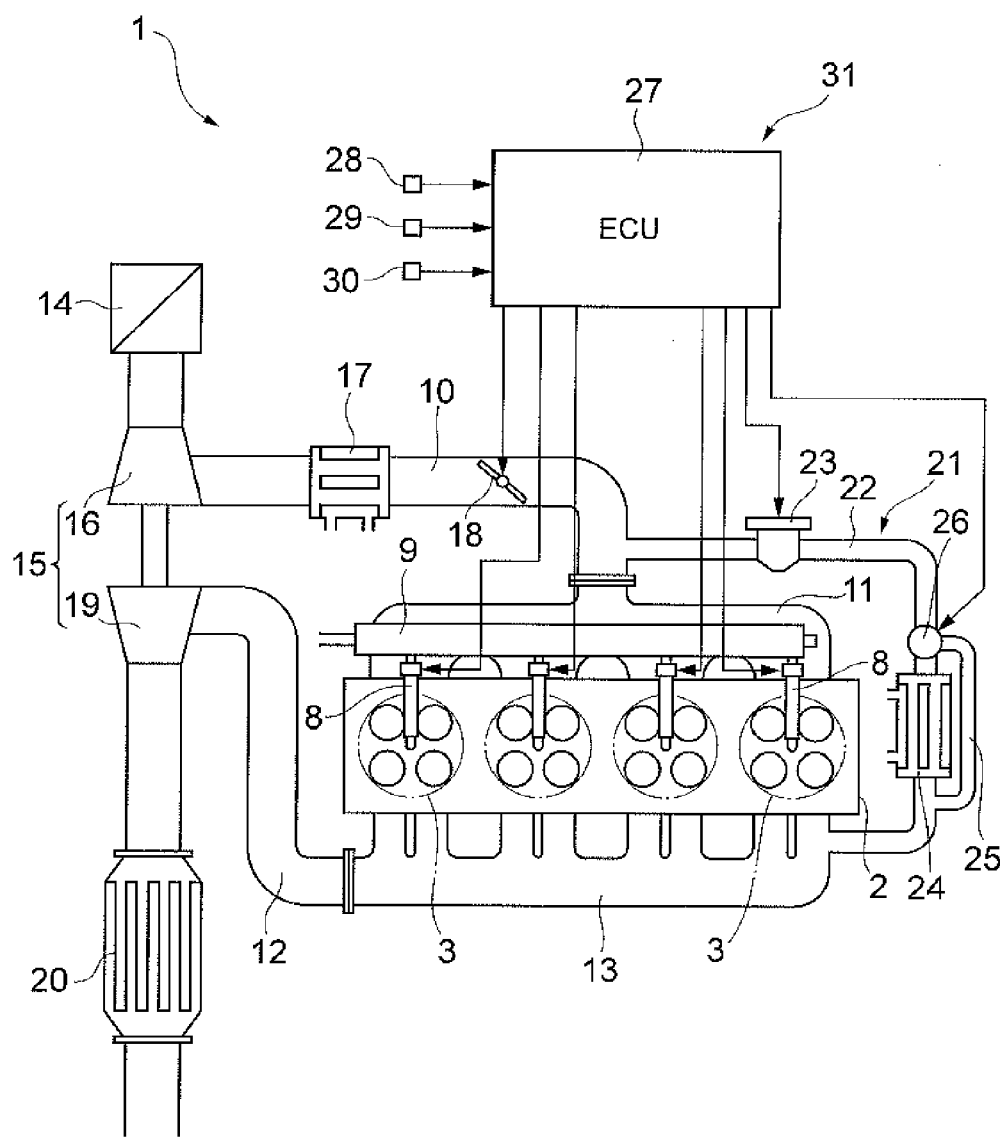
FIG. 1 is a schematic configuration diagram showing a diesel engine equipped with a fuel injection device according to an embodiment of the present invention.

FIG. 1 is a schematic configuration diagram showing a diesel engine equipped with a fuel injection device according to an embodiment of the present invention. The diesel engine 1 according to the present embodiment is an in-line four-cylinder diesel engine. The diesel engine 1 comprises an engine body 2 and this engine body 2 is provided with four cylinders 3.

Figure 2:
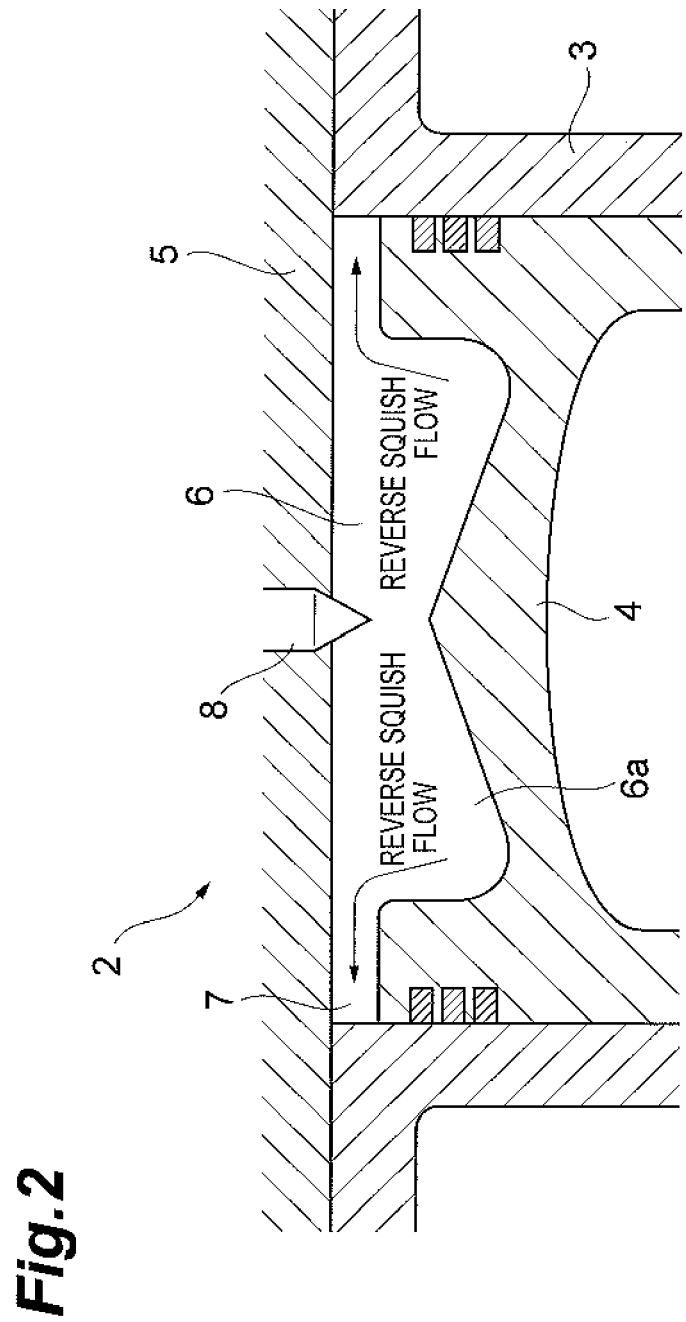
FIG. 2 is a cross-sectional view showing an engine body shown in FIG. 1.

A piston 4 is housed in each cylinder 3, as shown in FIG. 2. A cylinder head 5 is disposed on top of the cylinder 3. A space surrounded by the cylinder 3, piston 4, and cylinder head 5 constitutes a combustion chamber 6. A cavity 6a forming a part of the combustion chamber 6 is formed in the top part of piston 4. A region between a portion of the piston 4 on the peripheral side of cavity 6a and the cylinder head 5 constitutes a squish area 7.

An injector (fuel injection valve) 8 to inject fuel into the combustion chamber 6 is provided for each cylinder 3. The injector 8 has a plurality of holes (not shown) and radially injects the fuel from each of the holes. Each injector 8 is connected to a common rail 9 and the high-pressure fuel retained in the common rail 9 is constantly supplied to each injector 8.

An intake passage 10 for intake of air into the combustion chambers 6 is connected through an intake manifold 11 to the engine body 2. An exhaust passage 12 for discharge of exhaust gas after combustion is connected through an exhaust manifold 13 to the engine body 2.

The intake passage 10 is equipped with an air cleaner 14, a compressor 16 of a turbocharger 15, an intercooler 17, and a throttle valve 18 in order from upstream to downstream. The throttle valve 18 controls an intake amount of air into the combustion chambers 6. The exhaust passage 12 is provided with a turbine 19 of the turbocharger 15 and a catalyzed DPF (Diesel Particulate Filter) 20.

The diesel engine 1 is equipped with an EGR (Exhaust Gas Recirculation) device 21 to recirculate part of exhaust gas after combustion into the combustion chambers 6. The EGR device 21 has an EGR passage 22, an EGR valve 23, an EGR cooler 24, a bypass passage 25, and a changeover valve 26. The EGR passage 22 connects the intake passage 10 and the exhaust manifold 13. The EGR valve 23 controls a recirculation amount of exhaust gas (EGR gas) from the exhaust manifold 13 to the intake passage 10. The EGR cooler 24 cools the EGR gas passing through the EGR passage 22. The bypass passage 25 makes the EGR gas bypass the EGR cooler 24. The changeover valve 26 changes over the flow path of EGR gas between the EGR cooler 24 and the bypass passage 25.

The diesel engine 1 is controlled by an electronic control unit (ECU) (controller) 27. Connected to the ECU 27 are an accelerator pedal position sensor 28 to detect an accelerator opening degree, an engine speed sensor 29 to detect an engine speed, and a crank angle sensor 30 to detect an angle of the crank shaft (not shown) of the pistons 4. The ECU 27 controls the aforementioned injectors 8, throttle valve 18, EGR valve 23, and changeover valve 26, based on detection signals detected by these sensors 28-30.

The injectors 8, ECU 27, and sensors 28-30 constitute a fuel injection device 31 in the present embodiment. In the fuel injection device 31, the ECU 27 determines fuel injection quantities and fuel injection timings mainly from the engine speed and the accelerator opening degree and controls each injector 8 according to them. Namely, the ECU 27 operates each of the injectors 8, based on the determined fuel injection quantities and fuel injection timings. The ECU 27 is coupled to each injector 8.

Figure 3:
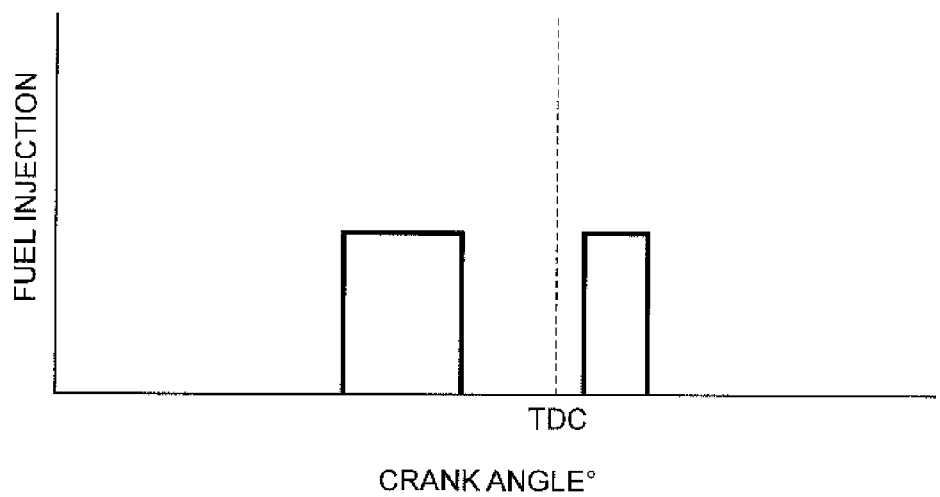
FIG. 3 is a drawing showing timings of two separate injections of fuel from an injector shown in FIG. 1.

The ECU 27 controls each injector 8 so as to perform premixed charge compression ignition combustion with two separate injections, as shown in FIG. 3. Namely, the ECU 27 controls each injector 8 to inject the fuel in two separate injections in one cycle consisting of an intake stroke, a compression stroke, an expansion stroke, and an exhaust stroke. In this case, preferably, a fuel injection quantity in the first time fuel injection is made larger than a fuel injection quantity in the second time fuel injection, particularly, in a high load range.

Figure 4:
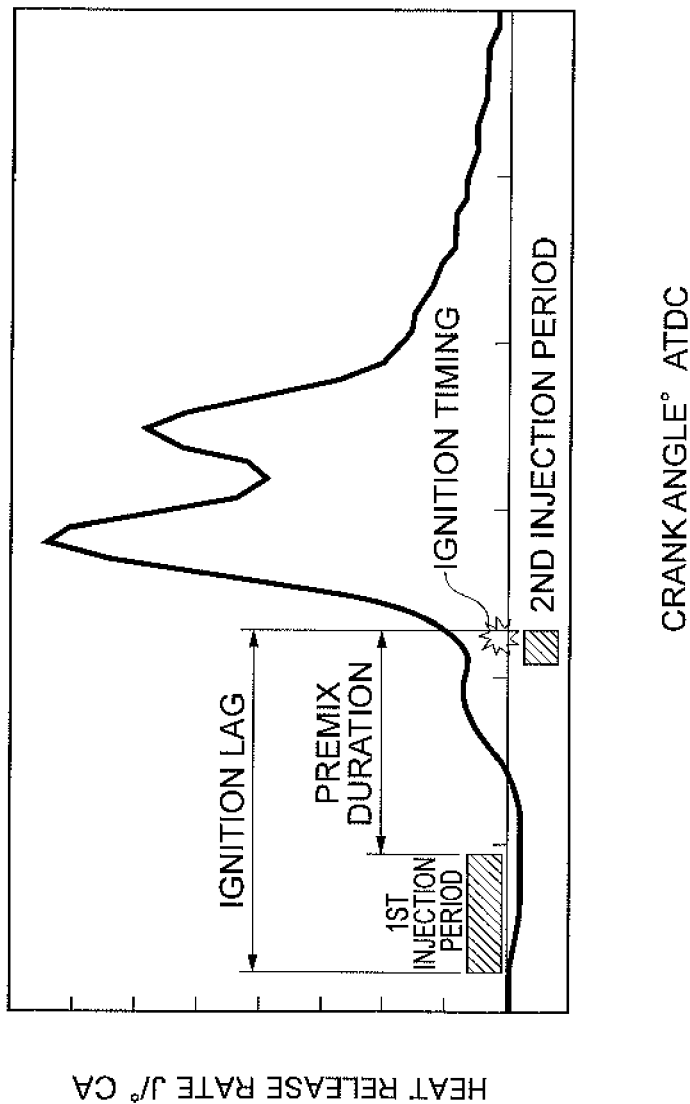
FIG. 4 is a graph showing fuel injection periods and a premix duration along with a relation between crank angle of piston and heat release rate.

The first time fuel injection (first fuel injection) is set so as to be carried out on the retard side with respect to a timing when a premix duration immediately after the first time fuel injection is minimum (>0). The premix duration, as shown in FIG. 4, is a period of time from an ending point of fuel injection to a starting point of ignition (high-temperature oxidation reaction). The reason why the timing of the first time fuel injection is set as described above is as described below.

Figure 5:
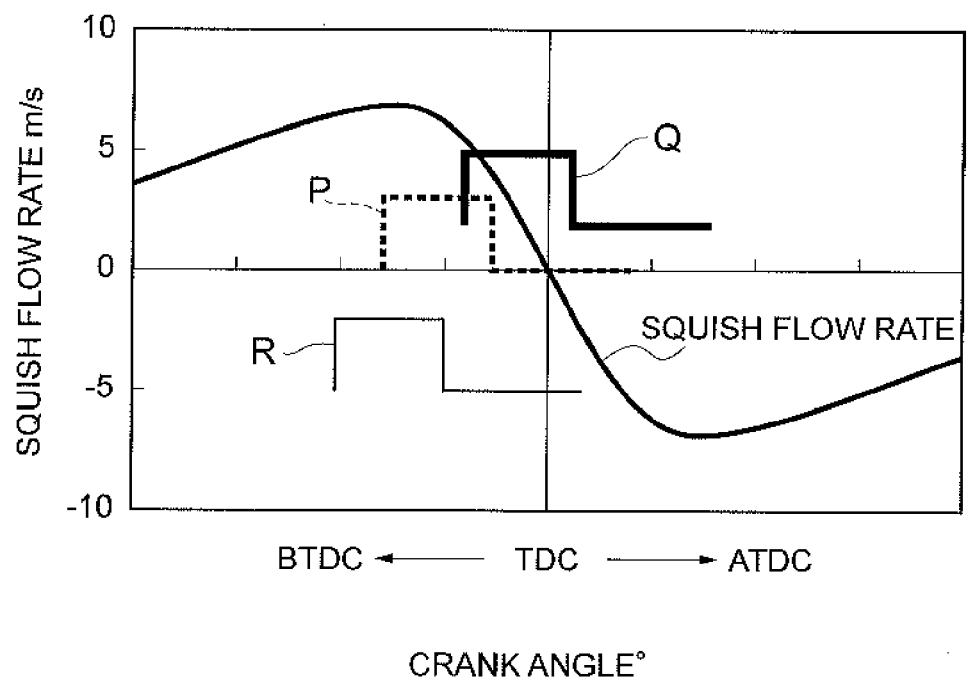
FIG. 5 is a graph showing a relation between crank angle of piston and squish flow rate with a first time fuel injection period and a premix duration immediately thereafter.

For example, as indicated by a dashed line P in FIG. 5, the premix duration of the first time fuel injection is minimum when the start timing of the premix duration of the first time fuel injection is before the compression top dead center (TDC) and when the end timing of the premix duration of the first time fuel injection is after the compression top dead center. The timing when the premix duration of the first time fuel injection is minimum varies depending upon the fuel injection quantity, operation conditions, and so on. If the first time fuel injection is carried out on the advance side or on the retard side with respect to the timing when the premix duration is minimum, the premix duration becomes longer (cf. FIG. 6). For this reason, air and fuel become easier to be mixed by the degree of increase of the premix duration, so as to reduce smoke eventually.

After the compression top dead center, the piston 4 moves toward the compression bottom dead center, thereby to cause a reverse squish flow (cf. FIG. 2) of air flowing from the cavity 6a toward the squish area 7. In addition, as the piston 4 leaves from near the compression top dead center, the flow rate of reverse squish flow suddenly increases up to a predetermined crank angle, as shown in FIG. 5.

When the first time fuel injection is carried out on the retard side with respect to the timing when the premix duration is minimum, a state in which the premix duration of the first time fuel injection ranges after the compression top dead center becomes longer, as indicated by a thick solid line Q in FIG. 5. For this reason, air and fuel become much easier to be mixed by making use of the high-speed reverse squish flow, which is effective to reduction of smoke. A thin solid line R in FIG. 5 represents a state in which the first time fuel injection is carried out on the advance side with respect to the timing when the premix duration is minimum.

Figure 6:
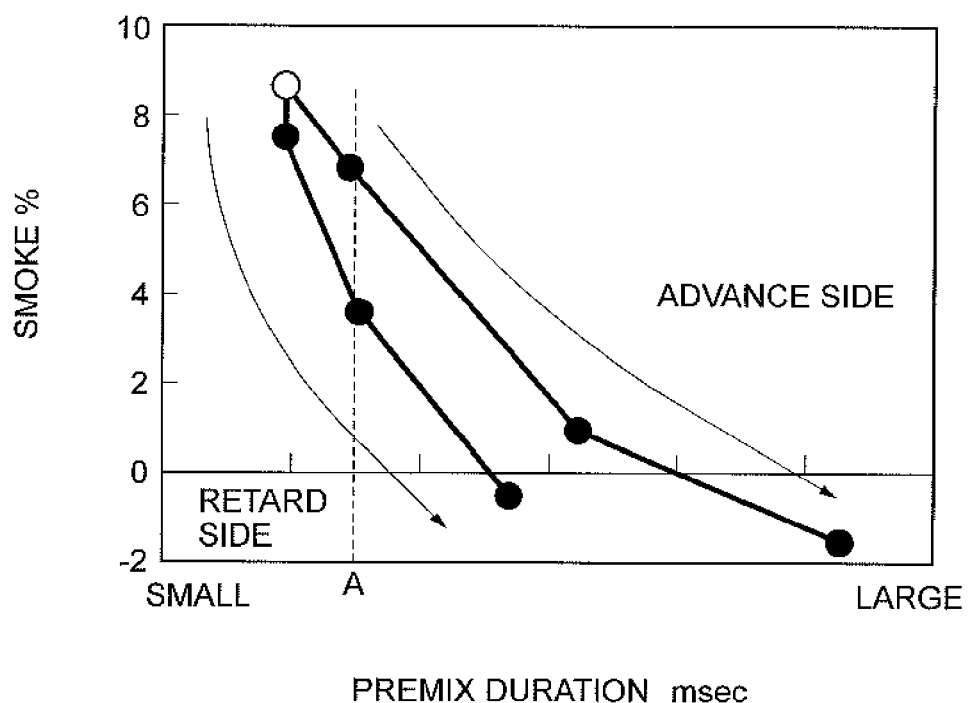
FIG. 6 is a graph showing an example of a relation between premix duration immediately after the first time fuel injection and smoke concentration.

For example, let us assume that the premix duration of the first time fuel injection is A ms as shown in FIG. 6. When the first time fuel injection is carried out on the advance side with respect to the timing when the premix duration is minimum (white dot in the drawing), a concentration of smoke is 6.9%. In contrast to it, when the first time fuel injection is carried out on the retard side with respect to the timing when the premix duration is minimum, the concentration of smoke is reduced to 3.6%. In FIG. 6, the concentration of smoke takes negative values in part, but this is an issue of a measuring device used in detection of smoke. The concentration of smoke itself takes no negative value in fact.

In the present embodiment, therefore, the first time fuel injection is set to be carried out on the retard side with respect to the timing when the premix duration immediately after the first time fuel injection is minimum. When the timing of the first time fuel injection is set in this manner, the timing of occurrence of high-temperature oxidation reaction (described below) by the first time fuel injection becomes certainly after the compression top dead center (cf. FIG. 7). Particularly, in the example shown in FIG. 5, the timing of the first time fuel injection is set in such a manner that the first time fuel injection is initiated before the compression top dead center and the first time fuel injection is terminated after the compression top dead center.

Figure 7:
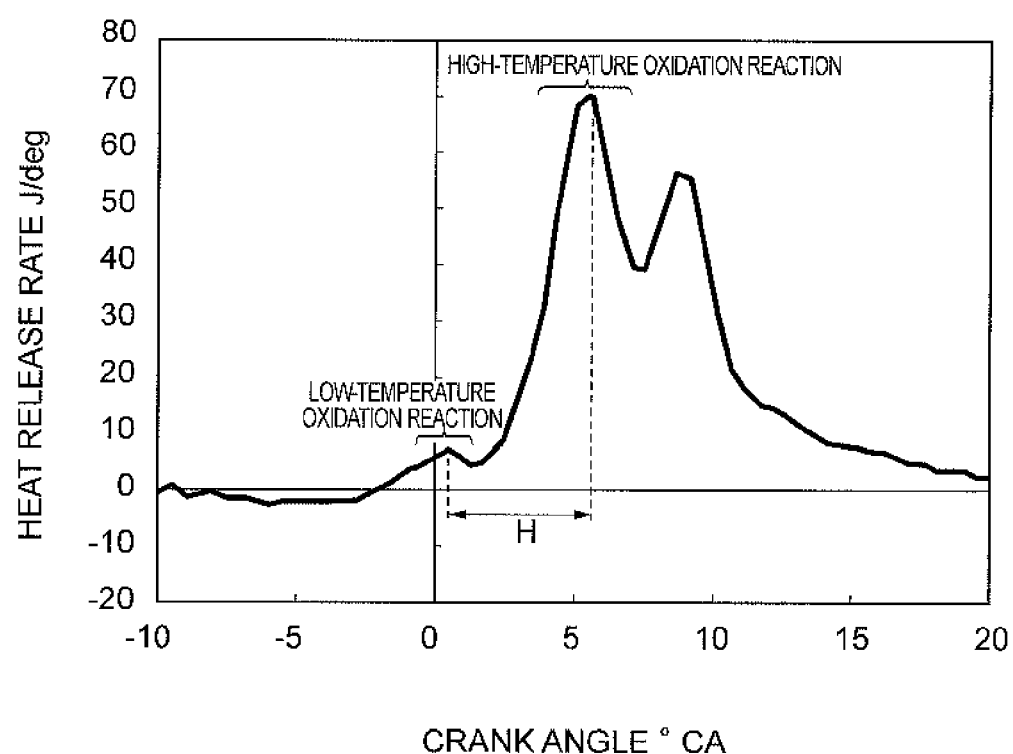
FIG. 7 is a graph showing the timing of the second time fuel injection along with a relation between crank angle of piston and heat release rate.

The second time fuel injection (second fuel injection), as shown in FIGS. 4 and 7, is set to be carried out at such a timing that a heat release rate waveform produced by the first time fuel injection and ignition and the second time fuel injection and ignition has a double-peaked shape. When ignition is performed after completion of injection of fuel, a heat release rate peak appears due to the high-temperature oxidation reaction. Therefore, when a time difference is placed between the first time fuel injection and the second time fuel injection, we can obtain the heat release rate waveform in which there are two heat release rate peaks due to the high-temperature oxidation reactions.

Specifically, the second time fuel injection is preferably carried out after the heat release rate peak due to the low-temperature oxidation reaction caused by the first time fuel injection and before the heat release rate peak due to the high-temperature oxidation reaction caused by the first time fuel injection (i.e., within a crank angle range H in FIG. 7). Particularly, it is more preferable to implement the initiation of the second time fuel injection at a timing after the heat release rate peak due to the low-temperature oxidation reaction caused by the first time fuel injection and implement the termination of the second time fuel injection before the start of the high-temperature oxidation reaction caused by the first time fuel injection.

The low-temperature oxidation reaction is also called cool flame reaction and is such reaction as to cause small change in temperature of gas but cause change in composition of gas. The high-temperature oxidation reaction is induced by ignition of fuel after the low-temperature oxidation reaction and is such reaction as to cause significant change in temperature of gas.

In the low load range, the second time fuel injection is preferably carried out at an earlier timing in the crank angle range H. In the high load range, the second time fuel injection is preferably carried out at a later timing in the crank angle range H. The fuel injection quantity in the second time fuel injection is set to be not more than 65% of the total of the first time fuel injection quantity and the second time fuel injection quantity. In this case, a ratio of the second time fuel injection quantity to the first time fuel injection quantity is preferably set to decrease with increase of load in the high load range.

When the premixed combustion is carried out in both of the first time fuel injection and the second time fuel injection, fuel and air are appropriately mixed. Therefore, it suppresses occurrence of local rich and local lean conditions, so as to reduce the smoke and NOx.

Figure 8:
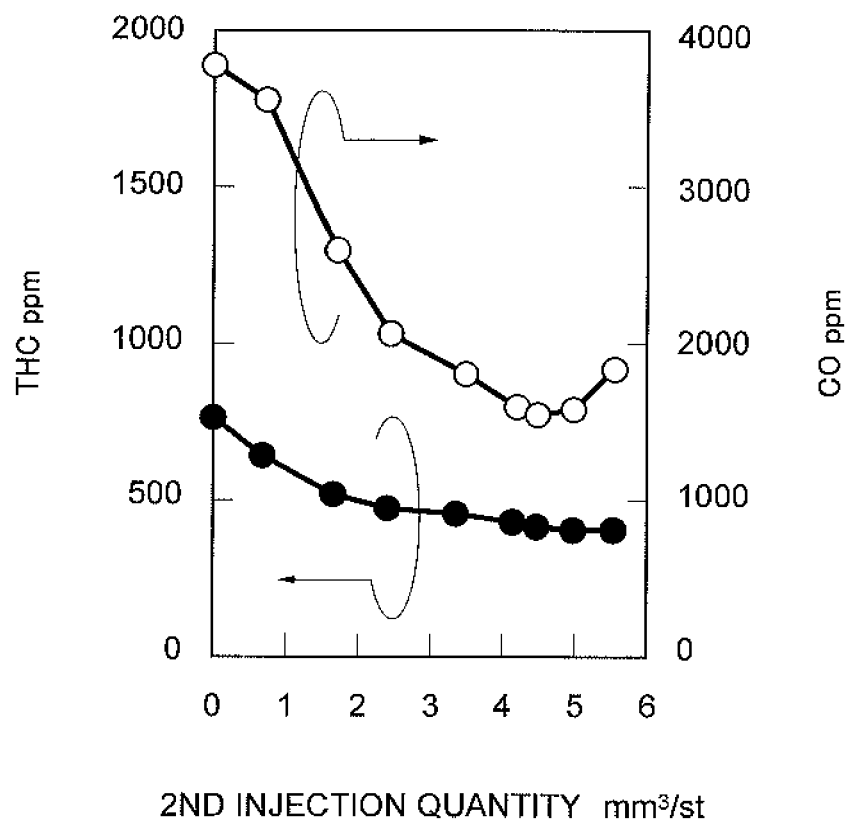
FIG. 8 is a graph showing an example of a relation of quantity of the second time fuel injection with HC concentration and CO concentration.

When the second time fuel injection is carried out, unburned components produced during the first time fuel injection are afterburned, so as to reduce unburned HC and unburned CO. For example, as shown in FIG. 8, HC and CO are more reduced in the case with execution of the second time fuel injection than in the case without execution of the second time fuel injection.

Figure 9:
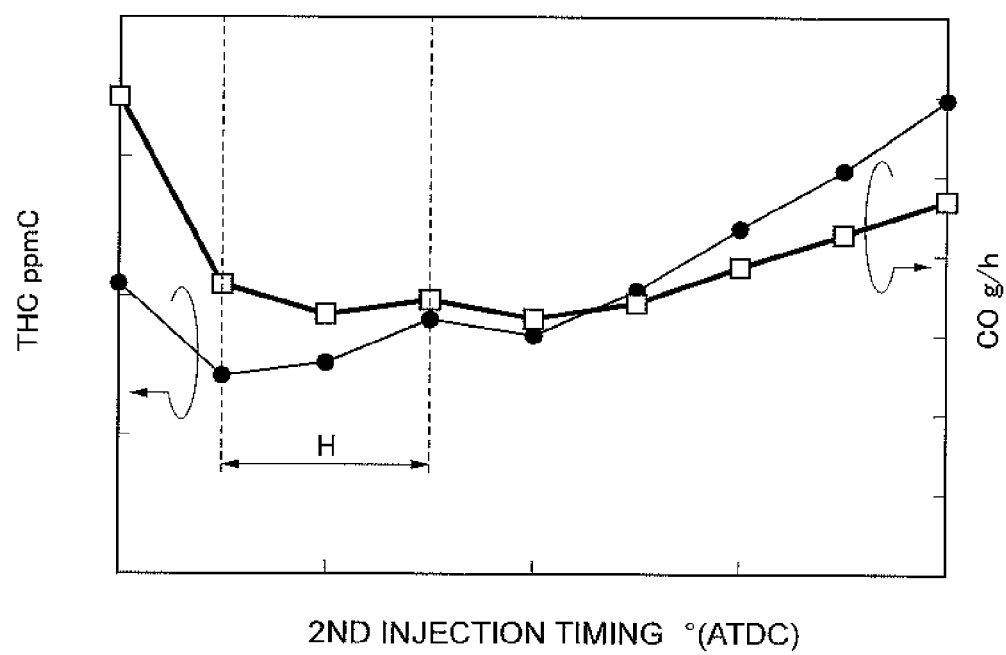
FIG. 9 is a graph showing an example of a relation of timing of the second time fuel injection with HC concentration and CO concentration.

When the second time fuel injection is carried out in the crank angle range H which is after the heat release rate peak due to the low-temperature oxidation reaction caused by the first time fuel injection and before the heat release rate peak due to the high-temperature oxidation reaction caused by the first time fuel injection, the high-temperature oxidation reaction caused by the second time fuel injection occurs after the start of the high-temperature oxidation reaction caused by the first time fuel injection. For this reason, the temperature of gas after combustion by the first time fuel injection is sufficiently raised, so as to promote oxidation reaction of unburned components remaining after the first time fuel injection. Therefore, it is feasible to further reduce unburned HC and unburned CO. For example, as shown in FIG. 9, HC and CO are more reduced in the case where the second time fuel injection is carried out in the crank angle range H than in the case where the second time fuel injection is carried out in a period outside the range H. This effect appears more significant, particularly, in the low load range where the combustion temperature is low.

Figure 10:
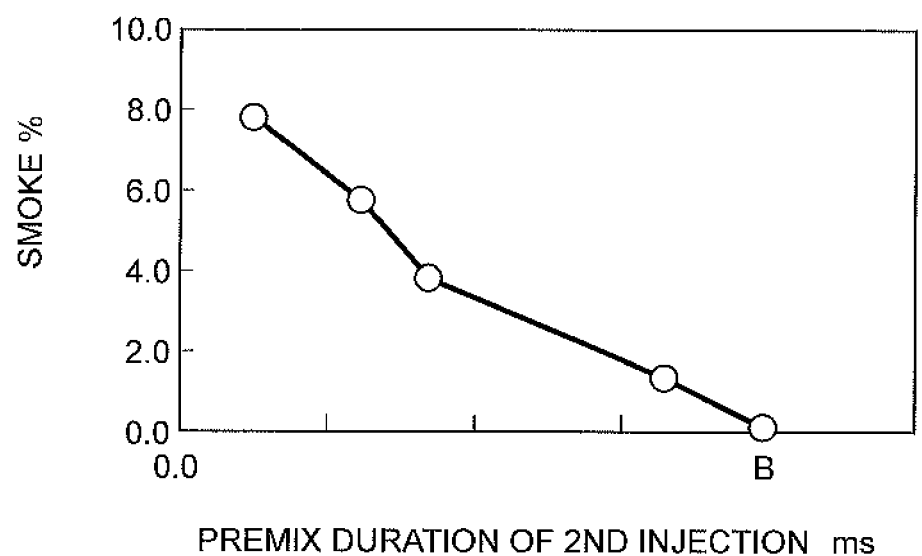
FIG. 10 is a graph showing an example of a relation between premix duration immediately after the second time fuel injection and smoke concentration.

When the sufficient premix duration is ensured for the second time fuel injection, air and fuel become easier to be mixed as described above, so as to achieve further contribution to reduction of smoke. For example, when the premix duration of the second time fuel injection is B ms as shown in FIG. 10, the concentration of smoke becomes almost zero.

Figure 11:
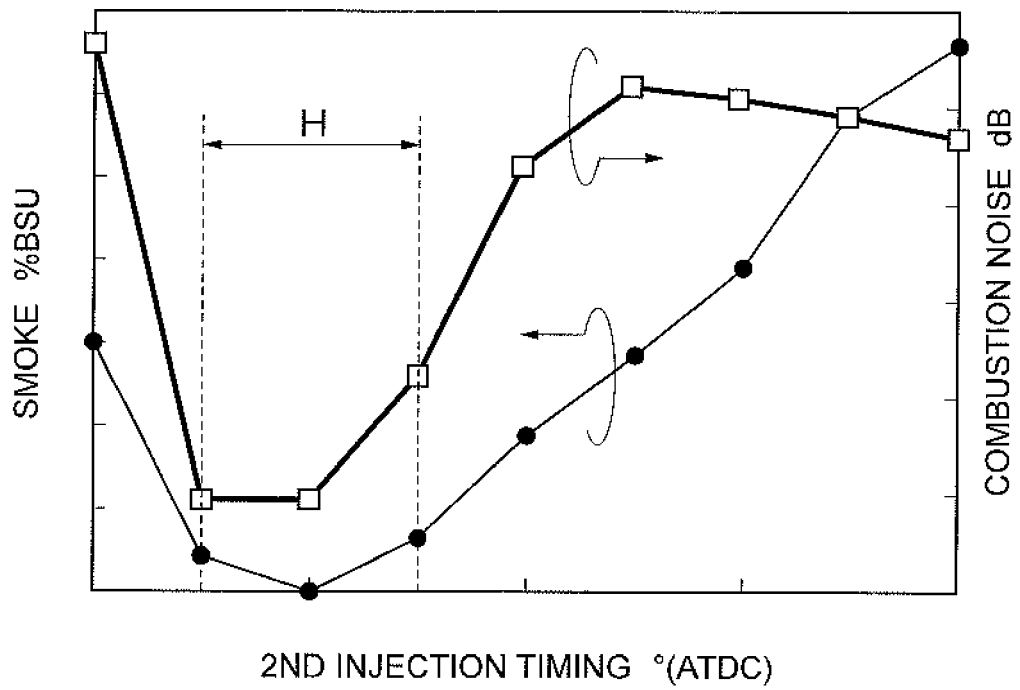
FIG. 11 is a graph showing an example of a relation between timing of the second time fuel injection and smoke concentration.

When the second time fuel injection ends before the peak of the high-temperature oxidation reaction caused by the first time fuel injection, the ambient temperature in the combustion chamber 6 is maintained low during the second time fuel injection. Therefore, an ignition lag of fuel due to the second time fuel injection becomes longer, so as to ensure a sufficient premix duration for the second time fuel injection. This can achieve further reduction of smoke. For example, as shown in FIG. 11, smoke becomes more reduced in the case where the second time fuel injection is carried out in the crank angle range H than in the case where the second time fuel injection is carried out in a period outside the range H.

Figure 12:
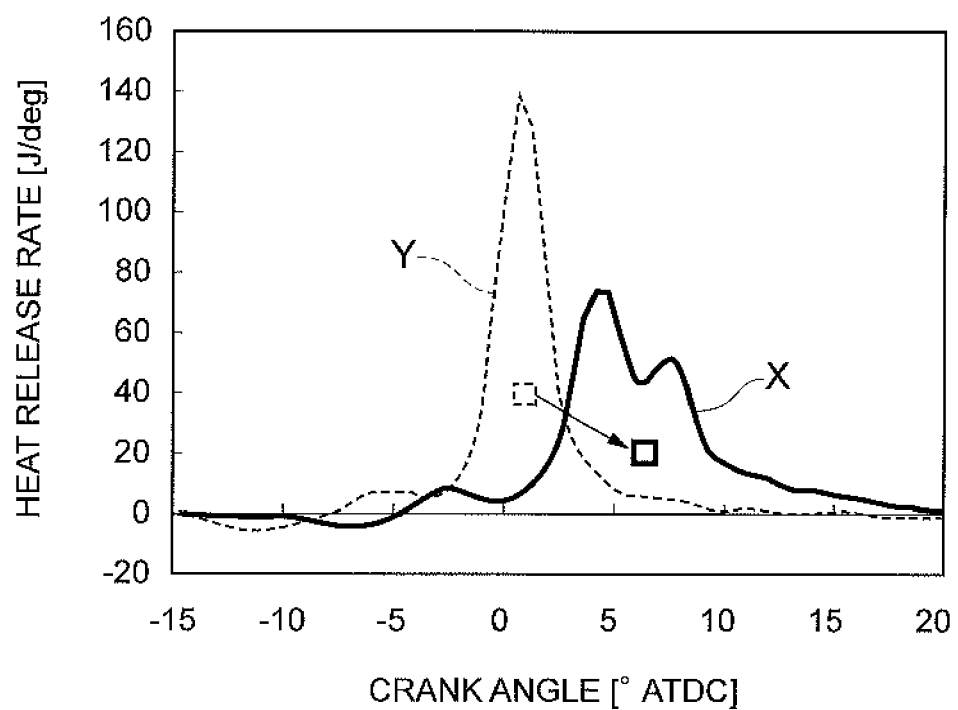
FIG. 12 is a graph showing the result of comparison between two separate injections and a single injection as to a relation between crank angle of piston and heat release rate.

When the premixed charge compression ignition combustion with two separate injections is carried out, the heat release rate peaks due to the high-temperature oxidation reactions become lower. For example, as shown in FIG. 12, the heat release rate peaks become lower in the case where the premixed charge compression ignition combustion with two separate injections (cf. solid line X) is carried out than in the case where the premixed charge compression ignition combustion with a single injection (cf. dashed line Y) is carried out. Furthermore, since the second time fuel injection absorbs heat generated by the first time fuel injection and ignition, the high-temperature oxidation reaction caused by the first time fuel injection becomes slow, so as to further reduce the heat release rate peak due to the high-temperature oxidation reaction.

Figure 13:
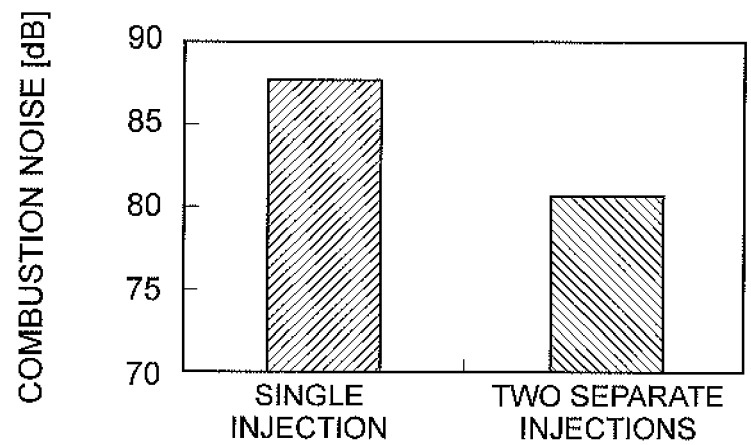
FIG. 13 is a graph showing the result of comparison between two separate injections and a single injection as to combustion noise and fuel consumption.
Figure 13:
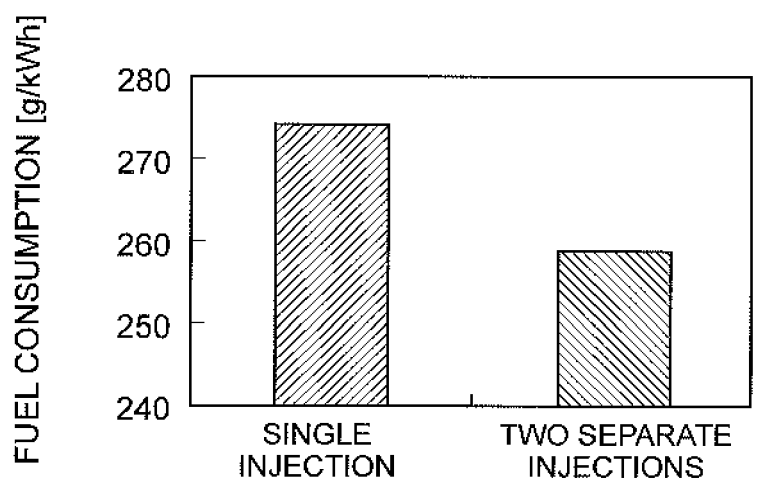

Since the heat release rate peaks are lowered in this manner, the in-cylinder pressure increase rate decreases, so as to decrease the combustion noise. For example, as shown in FIG. 13 (a), the combustion noise is more reduced in the case where the premixed charge compression ignition combustion with two separate injections is carried out than in the case where the premixed charge compression ignition combustion with a single ignition is carried out. For example, as shown in FIG. 11, the combustion noise is sufficiently reduced in the case where the second time fuel injection is carried out in the crank angle range H than in the case where the second time fuel injection is carried out in a period outside the range H.

Furthermore, as the heat release rate peaks are lowered, excessive sudden combustion is suppressed. For this reason, a cooling loss is reduced, so as to realize low-fuel-consumption combustion. For example, as shown in FIG. 13 (b), the fuel consumption is more reduced in the case where the premixed charge compression ignition combustion with two separate injections is carried out than in the case where the premixed charge compression ignition combustion with a single injection is carried out.

Figure 14:
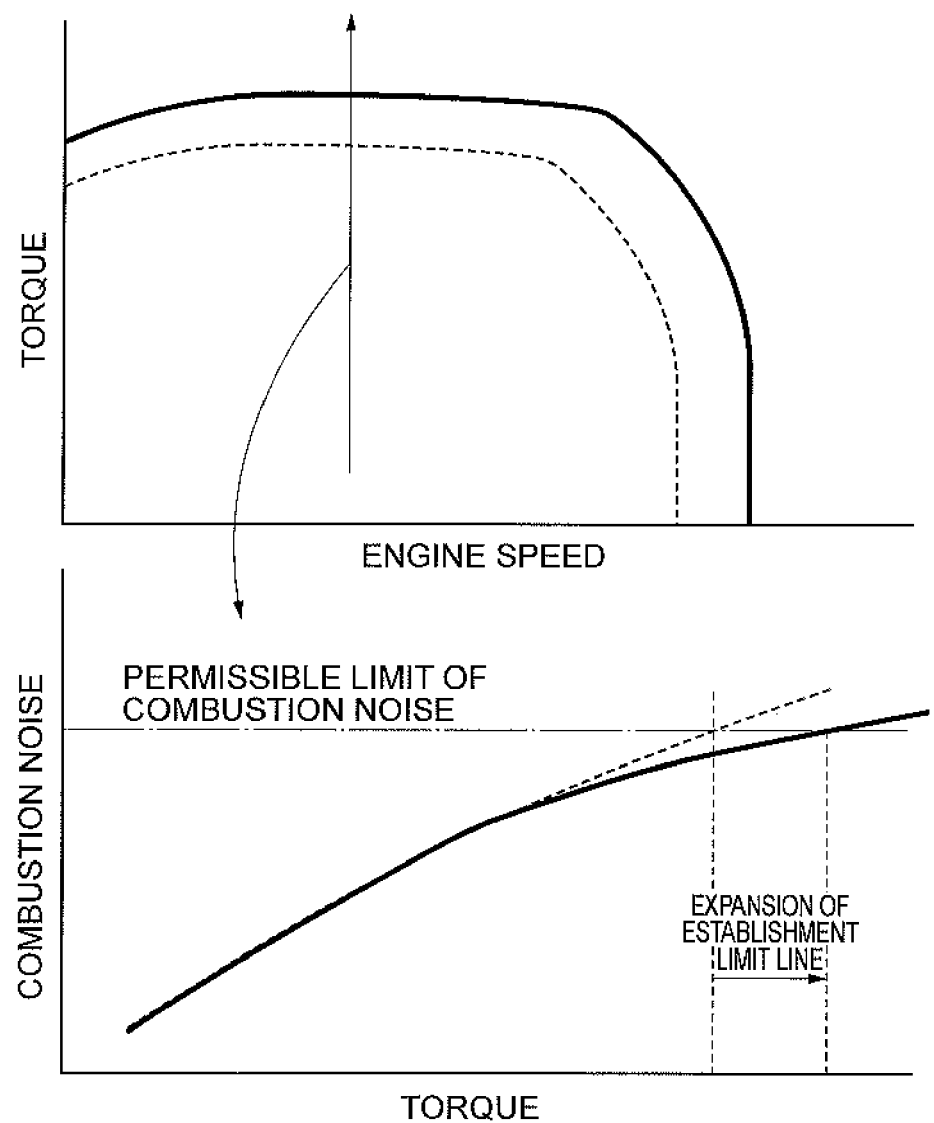
FIG. 14 is a graph showing a state in which an establishment limit line for premixed charge compression ignition combustion is expanded.

As described above, the present embodiment is able to sufficiently reduce the smoke, unburned HC and unburned CO, combustion noise, fuel consumption, and emissions in the premixed charge compression ignition combustion. As a result, it becomes feasible to expand the premixed combustion establishment region and to expand an operable range eventually. For example, as shown in FIG. 14, an establishment limit line of the premixed charge compression ignition combustion becomes widened to a higher engine speed (torque) in the case where the second time fuel injection is carried out in the crank angle range H (cf. a solid line) than in the case where the second time fuel injection is carried out after it (cf. a dashed line). FIG. 14 shows a state in which the establishment limit line of the premixed charge compression ignition combustion is expanded when the second time fuel injection timing is appropriately set.

Another aspect of the present embodiment is a fuel injection device for an engine to perform premixed charge compression ignition combustion, comprising: a fuel injection valve configured to inject fuel into a combustion chamber of the engine; and a controller coupled to the fuel injection valve and operating the fuel injection valve to inject the fuel in multiple separate injections, wherein the controller controls a timing of a first fuel injection by the fuel injection valve to carry out the first fuel injection on the retard side with respect to a timing when a premix duration immediately after the first fuel injection is minimum, and controls a timing of a second fuel injection by the fuel injection valve in such a manner that a heat release rate waveform produced by the first fuel injection and the second fuel injection carried out thereafter has a double-peaked shape.

Still another aspect of the present embodiment is a fuel injection device for an engine to perform premixed charge compression ignition combustion, comprising: a fuel injection valve configured to inject fuel into a combustion chamber of the engine; and a controller coupled to the fuel injection valve, and configured to operate the fuel injection valve to carry out a first fuel injection and a second fuel injection after the first fuel injection, to control a timing of the first fuel injection to carry out the first fuel injection on the retard side with respect to a timing when a premix duration immediately after the first fuel injection is minimum, and to control a timing of the second fuel injection in such a manner that a heat release rate waveform produced by the first fuel injection and the second fuel injection has a double-peaked shape.

The present invention is by no means limited to the above embodiment. For example, the above embodiment showed the premixed charge compression ignition combustion with two separate injections to inject the fuel in two separate injections, but the fuel may be injected in three or more separate injections. In this case, the fuel injection device 31 (ECU 27) may be configured to control the timing of the first fuel injection in such a manner that the first fuel injection is carried out on the retard side with respect to the timing when the premix duration immediately after the first fuel injection is minimum, and to control the timing of the second fuel injection in such a manner that the heat release rate waveform produced by the first fuel injection and the second fuel injection carried out thereafter has a double-peaked shape.

INDUSTRIAL APPLICABILITY

The present invention is applicable to a fuel injection device for an engine to perform Premixed Charge Compression Ignition combustion.

LIST OF REFERENCE SIGNS

1 . . . diesel engine; 6 . . . combustion chamber; 8 . . . injector (fuel injection valve); 27 . . . ECU (control means); 31 . . . fuel injection device.

The invention claimed is:

1. A fuel injection device for an engine to perform premixed charge compression ignition combustion, comprising:
   a fuel injection valve configured to inject fuel into a combustion chamber of the engine; and
   controlling means for controlling the fuel injection valve to inject the fuel in multiple separate injections,
   wherein the controlling means controls a timing of a first fuel injection by the fuel injection valve to begin the first fuel injection before the compression top dead center and to carry out the first fuel injection on the retard side with respect to a timing when a premix duration immediately after the first fuel injection is minimum, and controls a timing of a second fuel injection by the fuel injection valve carried out after the first fuel injection in such a manner that a heat release rate waveform produced by the first fuel injection and the second fuel injection has a double-peaked shape after the second fuel injection is carried out.

2. The fuel injection device according to claim 1,
   wherein the controlling means controls the timing of the first fuel injection by the fuel injection valve in such a manner that a starting timing of high-temperature oxidation reaction caused by the first fuel injection is after a compression top dead center.

3. The fuel injection device according to claim 1,
   wherein the controlling means controls the timing of the second fuel injection to carry out the second fuel injection after a heat release rate peak due to low-temperature oxidation reaction caused by the first fuel injection and before a heat release rate peak due to high-temperature oxidation reaction caused after the low-temperature oxidation reaction by the first fuel injection.

4. A fuel injection device for an engine to perform premixed charge compression ignition combustion, comprising:
   a fuel injection valve configured to inject fuel into a combustion chamber of the engine; and
   controlling means for controlling the fuel injection valve to inject the fuel in multiple separate injections,
   wherein the controlling means controls a timing of a first fuel injection by the fuel injection valve to carry out the first fuel injection on the retard side with respect to a timing when a premix duration immediately after the first fuel injection is minimum, and controls a timing of a second fuel injection by the fuel injection valve in such a manner that a heat release rate waveform produced by the first fuel injection and the second fuel injection carried out thereafter has a double-peaked shape,
   wherein the controlling means controls the timing of the second fuel injection by the fuel injection valve to carry out the second fuel injection after a heat release rate peak due to low temperature oxidation reaction caused by the first fuel injection and before a heat release rate peak due to high-temperature oxidation reaction caused after the low-temperature oxidation reaction by the first fuel injection.

5. The fuel injection device according to claim 4,
   wherein the controlling means controls the timing of the second fuel injection by the fuel injection valve to carry out the second fuel injection before a start of the high-temperature oxidation reaction caused by the first fuel injection.

6. A fuel injection device for an engine to perform premixed charge compression ignition combustion, comprising:
   a fuel injection valve configured to inject fuel into a combustion chamber of the engine; and
   a controller coupled to the fuel injection valve and operating the fuel injection valve to inject the fuel in multiple separate injections,
   wherein the controller controls a timing of a first fuel injection by the fuel injection valve to begin the first fuel injection before the compression top dead center and to carry out the first fuel injection on the retard side with respect to a timing when a premix duration immediately after the first fuel injection is minimum, and controls a timing of a second fuel injection by the fuel injection valve carried out after the first fuel injection in such a manner that a heat release rate waveform produced by the first fuel injection and the second fuel injection has a double-peaked shape after the second fuel injection is carried out.

7. The fuel injection device according to claim 6,
   wherein the controller controls the timing of the first fuel injection by the fuel injection valve in such a manner that a starting timing of high-temperature oxidation reaction caused by the first fuel injection is after a compression top dead center.

8. The fuel injection device according to claim 6,
   wherein the controller controls the timing of the second fuel injection to carry out the second fuel injection after a heat release rate peak due to low-temperature oxidation reaction caused by the first fuel injection and before a heat release rate peak due to high-temperature oxidation reaction caused after the low-temperature oxidation reaction by the first fuel injection.

9. A fuel injection device for an engine to perform premixed charge compression ignition combustion, comprising:

a fuel injection valve configured to inject fuel into a combustion chamber of the engine; and a controller coupled to the fuel injection valve and operating the fuel injection valve to inject the fuel in multiple separate injections, wherein the controller controls a timing of a first fuel injection by the fuel injection valve to carry out the first fuel injection on the retard side with respect to a timing when a premix duration immediately after the first fuel injection is minimum, and controls a timing of a second fuel injection by the fuel injection valve in such a manner that a heat release rate waveform produced by the first fuel injection and the second fuel injection carried out thereafter has a double-peaked shape, wherein the controller controls the timing of the second fuel injection by the fuel injection valve to carry out the second fuel injection after a heat release rate peak due to low temperature oxidation reaction caused by the first fuel injection and before a heat release rate peak due to high-temperature oxidation reaction caused after the low-temperature oxidation reaction by the first fuel injection.

10. The fuel injection device according to claim 9, wherein the controller controls the timing of the second fuel injection by the fuel injection valve to carry out the second fuel injection before a start of the high-temperature oxidation reaction caused by the first fuel injection.

11. A fuel injection device for an engine to perform premixed charge compression ignition combustion, comprising:

a fuel injection valve configured to inject fuel into a combustion chamber of the engine; and a controller coupled to the fuel injection valve, and configured to operate the fuel injection valve to carry out a first fuel injection and a second fuel injection after the first fuel injection, to control a timing of the first fuel injection to begin the first fuel injection before the compression top dead center and to carry out the first fuel injection on the retard side with respect to a timing when a premix duration immediately after the first fuel injection is minimum, and to control a timing of the second fuel injection in such a manner that a heat release rate waveform produced by the first fuel injection and the second fuel injection has a double-peaked shape after the second fuel injection is carried out.

12. The fuel injection device according to claim 11, wherein the controller is configured to control the timing of the first fuel injection in such a manner that a starting timing of high-temperature oxidation reaction caused by the first fuel injection is after a compression top dead center.

13. The fuel injection device according to claim 11, wherein the controller controls the timing of the second fuel injection to carry out the second fuel injection after a heat release rate peak due to low-temperature oxidation reaction caused by the first fuel injection and before a heat release rate peak due to high-temperature oxidation reaction caused after the low-temperature oxidation reaction by the first fuel injection.

14. A fuel injection device for an engine to perform premixed charge compression ignition combustion, comprising:

a fuel injection valve configured to inject fuel into a combustion chamber of the engine; and a controller coupled to the fuel injection valve, and configured to operate the fuel injection valve to carry out a first fuel injection and a second fuel injection after the first fuel injection, to control a timing of the first fuel injection to carry out the first fuel injection on the retard side with respect to a timing when a premix duration immediately after the first fuel injection is minimum, and to control a timing of the second fuel injection in such a manner that a heat release rate waveform produced by the first fuel injection and the second fuel injection has a double-peaked shape, wherein the controller is configured to control the timing of the second fuel injection to carry out the second fuel injection after a heat release rate peak due to low-temperature oxidation reaction caused by the first fuel injection and before a heat release rate peak due to high temperature oxidation reaction caused after the low-temperature oxidation reaction by the first fuel injection.

15. The fuel injection device according to claim 14, wherein the controller is configured to control the timing of the second fuel injection to carry out the second fuel injection before a start of the high-temperature oxidation reaction caused by the first fuel injection.

\* \* \* \* \*